United States Patent [19]

McLain

[11] 3,846,590

[45] Nov. 5, 1974

[54] TELEPHONIC EQUIPMENT DISTRIBUTION PANEL ASSEMBLY

[75] Inventor: Travis R. McLain, Channelview, Tex.

[73] Assignee: The Siemon Company, Watertown, Conn.

[22] Filed: Jan. 16, 1973

[21] Appl. No.: 324,126

[52] U.S. Cl. .................................................. 179/98
[51] Int. Cl. .............................................. H04q 1/14
[58] Field of Search .............. 179/98; 317/99; 52/70

[56] References Cited

UNITED STATES PATENTS

| | | | |
|---|---|---|---|
| 835,268 | 11/1906 | White | 179/98 |
| 1,828,642 | 10/1931 | Bunker | 52/70 |
| 3,234,498 | 2/1966 | Logan | 339/97 |
| 3,610,836 | 10/1971 | Kimura et al. | 179/98 |
| 3,660,613 | 5/1972 | Mullin et al. | 179/98 |

*Primary Examiner*—Kathleen H. Claffy
*Assistant Examiner*—Mitchell Saffian
*Attorney, Agent, or Firm*—Roylance, Abrams, Berdo & Kaul

[57] ABSTRACT

There is disclosed a telephonic distribution panel assembly supported on a three-sided frame. The frame comprises three flat side members positioned with respect to each other so as to form a support having a triangular cross section the support having a plurality of terminal connecting blocks thereon.

4 Claims, 5 Drawing Figures

TELEPHONIC EQUIPMENT DISTRIBUTION PANEL ASSEMBLY

This invention relates to a telephonic equipment distribution panel assembly.

It is common practice in office buildings having a large number of individual telephones scattered throughout the building to have a number of distribution panels in the building. The distribution panels are often mounted on a wall in a small room or closet on each floor of an office building. A number of telephonic electrical instruments, e.g., terminal connecting blocks, are mounted on the panels. It is frequently necessary for telephone workmen to connect new telephones to or disconnect telephones from the panels and perform various other functions with respect to these panels. Accordingly, it is essential that the panels be readily accessible. Moreover, since space is at a premium in office buildings, it is desirable to fit a maximum amount of telephonic equipment in a minimum amount of space.

It is an object of this invention to provide a means for mounting a maximum amount of telephonic equipment in a minimum amount of space.

It is another object of this invention to provide an apparatus for mounting telephonic equipment which permits ready access to the equipment mounted thereon.

It is a further object of this invention to provide such an apparatus which eliminates the problem of acquiring expensive wall space in new buildings and hard-to-find wall space in old buildings.

These and other objects are attained by the practice of this invention which, briefly, comprises providing a telephonic equipment distribution panel assembly supported on a three-sided frame. The frame comprises three flat mounting members positioned with respect to each other so as to form a support having a triangular cross section.

This invention will be more particularly described with reference to the accompanying drawings wherein.

Figure 3:
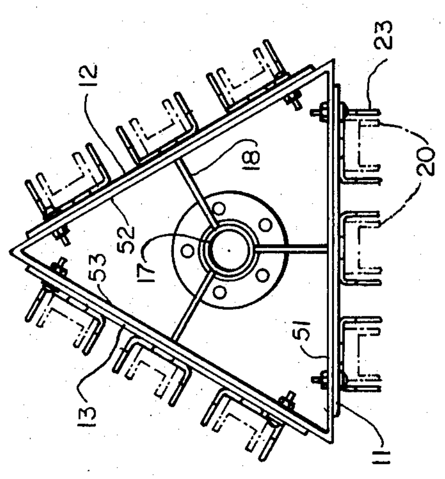
FIG. 3 is a top elevation corresponding to FIG. 2.

Referring more particularly to the drawings, there is shown a three-sided frame 10 comprising three flat mounting members or surfaces 11, 12 and 13 which are secured to the triangular support members 14 and 15 by means of bolts 16. The triangular members 14 and 15 are secured to an upright, central post 17 by means of radial arms 18. The bottom of the post 17 is secured to a base member or flange 19. The flange 19 permits the frame 10 to be bolted to the floor. Each of the sides of support member 14 lies in the same substantially vertical plane as one of the sides of support member 15. Thus, side 51 of support member 14 is in the same substantially vertical plane as side 51' of support member 15, side 52 is in the same substantially vertical plane as side 52', and side 53 is in the same substantially vertical plane as side 53'. Each of the three flat mounting members 11, 12 and 13 are coupled to a respective pair of coplanar sides of the support members 14 and 15. Thus, mounting member 11 is coupled to coplanar sides 51 and 51', mounting member 12 is coupled to coplanar sides 52 and 52' and mounting member 13 is coupled to coplanar sides 53 and 53'.

In a typical embodiment, each side of the triangular support members 14 and 15 is 21 inches in width; the mounting surfaces 11, 12 and 13 are 18 inches in width and 4 feet in height; and the post 17 is 2 inches in diameter. The mounting surfaces 11, 12 and 13 may be made of wood, metal or plastic, e.g., plexiglas.

Figure 2:
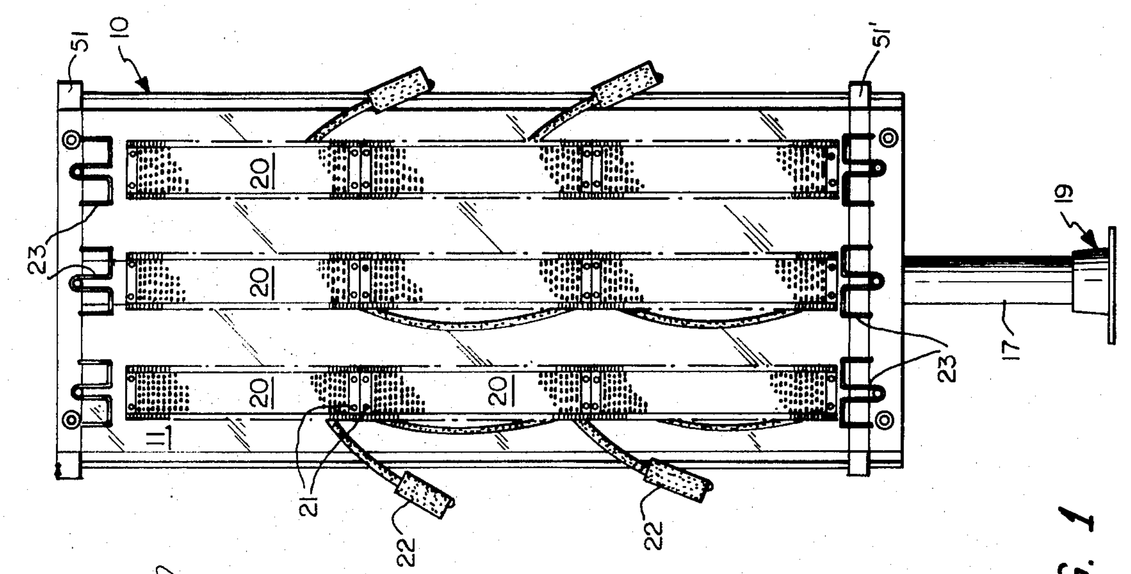
FIG. 2 is a side elevation showing portions of telephonic equipment mounted on the frame.
Figure 1:
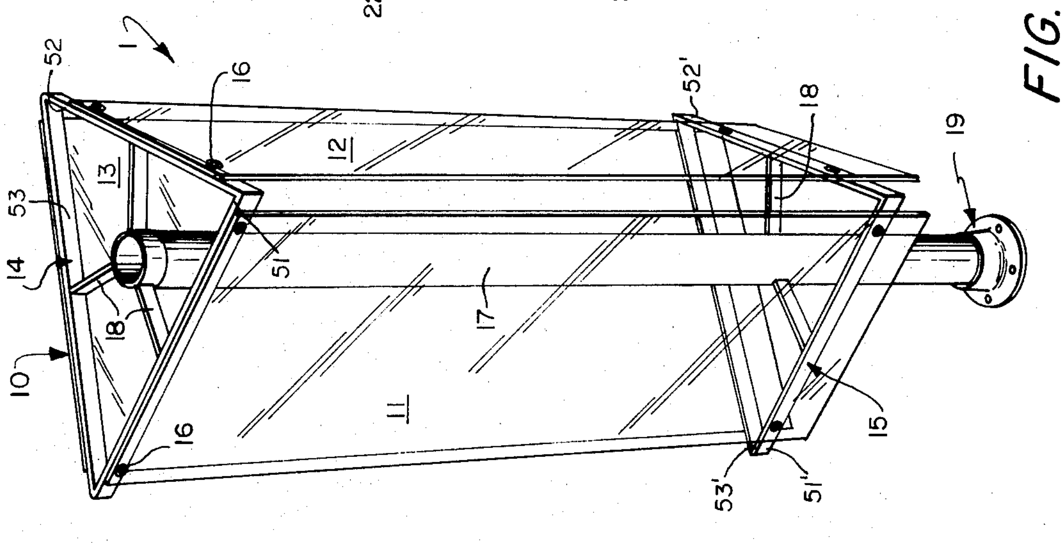
FIG. 1 is a perspective view of the three-sided frame.

FIGS. 2 and 3 show the three-sided frame 10 being used to support telephonic equipment. In the embodiment shown, terminal connecting blocks 20 are secured to the mounting surfaces 11, 12 and 13 by bolts 21. Nine terminal connecting blocks are mounted to each surface, three blocks in each of three spaced side-by-side rows. The terminal connecting blocks, which are not shown in detail in the drawing, are a typical type of terminal connecting block such as disclosed in U.S. Pat. No. 3,234,498, the disclosure of which is incorporated herein by reference. Such a terminal connecting block comprises a plurality of clip-type connector elements arranged in spaced side-by-side rows of terminals in a connector block, each element comprising a plurality of connectors joined together at a base portion. The assembly may also be fitted with plug-ended cables 22 and wire strand supporting means 23. The provision of the plug-ended cables permits the assembly to be prefabricated at a central assembly point, such as the telephone company shop. The unit may then be transported to the job site wherein it may be very quickly and efficiently installed by plugging it in, thus cutting labor costs at the installation site.

The wire strand supporting means 23 which are mounted above and beneath the columns of connecting blocks 20 support wire strands which connect one row of blocks to an adjacent row of blocks so that the wires will not drape across the front of the blocks. Such devices are disclosed in detail in copending application Ser. No. 319,356, filed Dec. 29, 1972 entitled "Wire Strand Supporting Means", the disclosure of which is incorporated herein by reference.

Figure 5:
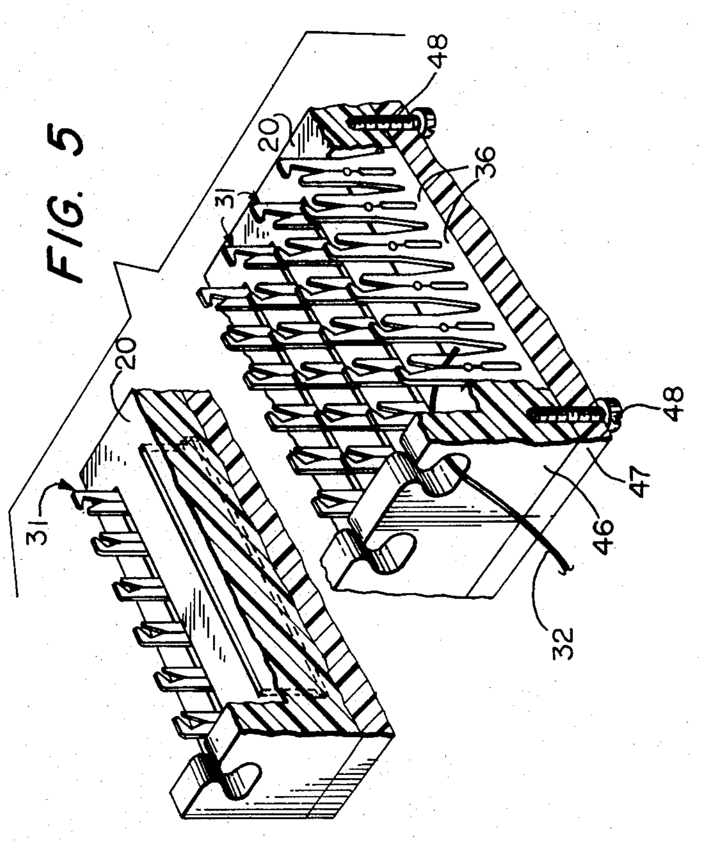
FIG. 5 is a perspective view of a terminal block incorporating a number of the connectors of FIG. 4.
Figure 4:
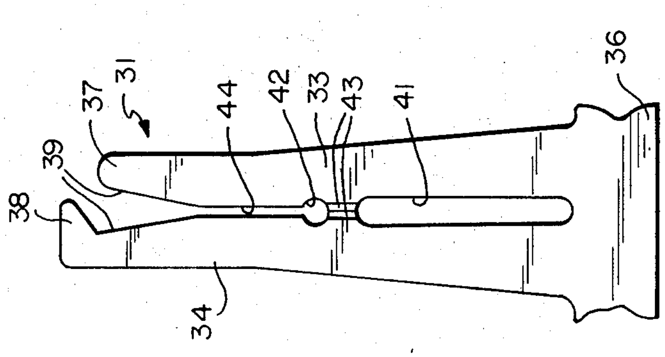
FIG. 4 is an enlarged, fragmentary, front-elevational view of an electrical connector.

Referring now to FIG. 4, there is shown a clip-type connector 31 for mechanically retaining and electrically contacting an insulated conductor 32. The connector 31 includes first and second elongated elements or jaws 33 and 34 joined at one end by a base portion 36 and free at the other end. The free end of the first jaw 33 has a rounded portion 37 while the free end of the second jaw 34 has a sidewise rounded protruding portion or hook 38 extending partially over the rounded portion 37. The rounded portion 37 coacts with the hook 38 to form a V-shaped conductor-receiving passageway 39 in which an insulated electrical conductor 32 may be conveniently placed and held, as shown in FIG. 5. Formed between the jaws 33 and 34 is a slot 41, the dimensions of which determine the forces exerted by the jaws 33 and 34 against the conductor 32 when it is forced therebetween. Moreover, an aperture 42 located above the slot 41 is formed between the jaws 33 and 34. The aperture 42 in cooperation with the slot 41, defines the length of portions or protuberances 43 produced by deforming the inner edges of the jaws 33 and 34. The function of the deformed portions 43 is to resiliently hold apart the jaws 33 and 34 to establish a space 44 between such jaws 33 and 34. As shown in FIG. 5, a plurality of the connectors 31 are joined together by the base portions 36 thereof and a group of such joined connectors 31 are mounted in a terminal block 20 to form a unit. Securely holding the connectors 31 within the block 20 is a base 47 secured to the block 20 by a threaded members 48.

An apparatus cabinet may be mounted on one side of the assembly. This permits the assembly to be fitted with an auxiliary power supply or other apparatus.

The mounted telephone distribution panel assembly of this invention possesses several advantages over distribution panels which are commonly mounted on walls in addition to those already mentioned. Since telephonic equipment such as terminal connecting blocks can be mounted on all three sides of the frame, more equipment may be contained in floor space 21 inches in diameter than can be mounted in 96 square feet of wall space. This reduces the problem of acquiring expensive wall space in new buildings and hard-to-find wall space in old buildings. Since two or three persons can be working on the panels all at the same time, one person working on each side of the three-sided frame, labor costs are reduced.

Moreover, the system can be expanded for future growth by tying additional telephonic equipment mounted on three-sided frames together with tie cables. Further, the telephone cables, which can enter from the top or the bottom of the assembly, are hidden behind the mounting members.

I claim:

1. A telephonic equipment distribution panel assembly for use inside a building, the combination comprising:

a base member supported on the floor of the building;

an upright, central post supported on said base member;

a plurality of triangular shaped support members coupled to said post by means of radial arms, said support members being spaced along said post;

each of the sides of one of said support members lying in the same substantially vertical plane as one of the sides of another of said support members;

three flat mounting members, each coupled to a respective pair of coplanar sides of said support members; and a plurality of terminal connecting blocks secured to each of said mounting members in spaced, side-by-side rows.

2. An assembly as defined in claim 1 which additionally contains a plurality of plug-ended cables.

3. An assembly as defined in claim 1 wherein said terminal connecting blocks comprises a plurality of clip-type connector elements arranged in spaced side-by-side rows of terminals in a connector block, said elements comprising a plurality of connectors joined together at a base portion, each said connector comprising a pair of electrically conductive elongated elements having opposing free ends and integral with said base section for supporting said free ends, said base section biasing said free ends toward one another, said elongated elements comprising a pair of mutually opposed edges for shearing insulation from a conductor inserted therebetween.

4. An assembly as defined in claim 1 wherein a plurality of wire strand supporting means are mounted above and beneath said connecting blocks.

* * * * *